US007002462B2

(12) United States Patent
Welch (10) Patent No.: US 7,002,462 B2
(45) Date of Patent: Feb. 21, 2006

(54) SYSTEM AND METHOD FOR REMOTE MONITORING AND MAINTENANCE MANAGEMENT OF VERTICAL TRANSPORTATION EQUIPMENT

(75) Inventor: Patrick J. Welch, Danbury, CT (US)

(73) Assignee: Gannett Fleming, Camp Hill, PA (US)

( * ) Notice: Subject to any disclaimer, the term of this patent is extended or adjusted under 35 U.S.C. 154(b) by 590 days.

(21) Appl. No.: 10/079,281

(22) Filed: Feb. 20, 2002

(65) Prior Publication Data

US 2002/0113877 A1    Aug. 22, 2002

Related U.S. Application Data

(60) Provisional application No. 60/270,257, filed on Feb. 20, 2001.

(51) Int. Cl.
*G08B 29/00*    (2006.01)

(52) U.S. Cl. .................. 340/506; 340/3.1; 340/286.02; 340/679

(58) Field of Classification Search ........... 340/506, 340/3.1, 286.02, 679, 685; 187/193
See application file for complete search history.

(56) References Cited

U.S. PATENT DOCUMENTS

| | | | |
|---|---|---|---|
| 4,568,909 A | * | 2/1986 | Whynacht .................. 187/393 |
| 5,007,506 A | | 4/1991 | Suzuki et al. |
| 5,382,943 A | | 1/1995 | Tanaka |
| 5,528,499 A | | 6/1996 | Hagenbuch |
| 5,588,038 A | | 12/1996 | Snyder |
| 6,006,171 A | * | 12/1999 | Vines et al. ................. 702/184 |
| 6,462,654 B1 | | 10/2002 | Sandelman et al. |
| 2001/0034567 A1 | | 10/2001 | Allen et al. |
| 2001/0055965 A1 | | 12/2001 | Delp et al. |
| 2003/0067387 A1 | | 4/2003 | Kwon et al. |
| 2003/0079012 A1 | | 4/2003 | Marsland |

FOREIGN PATENT DOCUMENTS

| | | |
|---|---|---|
| JP | 03159446 A | 7/1991 |
| JP | 03296898 A | 12/1991 |
| JP | 05288000 A | 11/1993 |
| JP | 06156965 A | 6/1994 |
| JP | 2000090374 A | 3/2000 |
| JP | 2001240337 A | 9/2001 |
| JP | 2002020049 A | 1/2002 |
| JP | 2003040545 A | 2/2003 |
| WO | WO 02/064479 A1 | 8/2002 |

* cited by examiner

*Primary Examiner*—Daryl C. Pope
(74) *Attorney, Agent, or Firm*—McNees Wallace & Nurick LLC (57) ABSTRACT

The Vertical Transportation-Maintenance Management System (VTMMS) invention described herein is directed towards an automated system and method for monitoring, management, and maintenance of transportation equipment, including but not limited to escalators, elevators, moving walkways, baggage carousels, revolving doors, and automated doors. The system and method is also adaptable to heating, ventilation, and air conditioning units and other building equipment. The system and method collects data from the monitored equipment and preserves data that is related to equipment alarms, faults, failures, and maintenance requirements and activities as determined by monitoring software.

19 Claims, 7 Drawing Sheets

SYSTEM AND METHOD FOR REMOTE MONITORING AND MAINTENANCE MANAGEMENT OF VERTICAL TRANSPORTATION EQUIPMENT

This application claims the benefit of provisional application 60/270,257 filed Feb. 20, 2001.

FIELD OF THE INVENTION

The present invention is directed to apparatus and methods for remote monitoring and maintenance management of vertical transportation equipment. In particular, the present invention is directed to the field of data capture and management to permit reliable monitoring, repair and maintenance of transportation equipment such as escalators, elevators, moving walkways, baggage carousels, revolving doors, and automated doors.

BACKGROUND OF THE INVENTION

Commercial, industrial, and mass transit and residential property owners are faced with daily challenges concerning the reliable operation of vertical transportation equipment. Escalators, elevators, and moving walkways carousels, and revolving doors must reliably function to allow movement of people and supplies. The unexpected failure of any vertical transportation equipment results in immediate inconvenience and in higher repair costs to the owner. Moreover, when an equipment failure involves vertical transportation equipment, passengers and personal property on or near the equipment may be injured or damaged. Injuries and alleged injuries may result in lawsuits against the owner, maintenance personnel, and the equipment manufacturer. For all these reasons, accurate and reliable concerning the operational status of vertical transportation equipment before, during, and after any failure is critical.

Most manufacturers of vertical transportation equipment incorporate electrical circuitry such as sensors and alarms which can detect an equipment failure and dictate an immediate, if limited, response. For example, modem elevators utilize light and pressure sensors to ensure that doors do not shut if a passenger or an item is blocking the doors. Modem escalators incorporate handrail speed sensors which stop the escalator if a passenger misuses the handrail (such as by sitting on the handrail) while the escalator is in motion. Such known safety devices serve a valuable purpose, but their usefulness is limited, and can be significantly expanded by capturing and managing additional data related to the triggering of the device. For example, if a sensor on an escalator stops because of excessive handrail pressure, it would be helpful to know, for example: whether the escalator stopped abruptly, or whether it decelerated slowly; whether it started up again immediately, or whether there was a significant delay; whether the cause of the fault was a heavy package on the handrail, or whether the cause was a person sitting on the handrail; whether the person or package fell when the escalator stopped; whether there were any other passengers on the escalator, and if so, how many; and whether any of passengers fell when the escalator stopped or re-started. Known monitoring systems for escalators, elevators, moving walkways, and carousels do not address these needs.

Additionally, owners and maintenance personnel have been known to disconnect or mechanically override manufacturer's safety devices on all types of vertical transportation equipment. For example, modem escalators have comb impact devices which are designed to shut down the escalator when a pressure exceeding a pre-determined level is detected. In high-traffic environments such as public transit facilities, owners and maintenance personnel have been known to secretly override the comb impact safety devices in order to allow heavier traffic loads and to avoid frequent nuisance shutdowns. If the equipment suffers a failure that requires investigation, the owner or maintenance personnel can easily and undetectably remove the bolts, destroying evidence of the override and leaving the manufacturer responsible to explain why the safety devices did not function as designed. All too often, the owner or manufacturer is left with inadequate information to explain the failure, and therefore liable to an injured party or to the owner of the equipment for damages incurred. For these reasons, there exists a continuing need for accurate and reliable data capture concerning all failures, faults, and alarms triggered on transportation equipment.

Many municipal transit facilities, as well as public and private properties which require mass movement of people and personal property, utilize several different types and brands of transportation equipment such as elevators, escalators, moving walkways, carousels, revolving doors, and automated doors. Such facilities present significant challenges in the form of monitoring and maintenance. Many public authorities have difficulty determining whether their transportation equipment is even running or not at any given time. Often, the only sources of reports of equipment problems are complaints from the public, or the occasional report from a station manager or other employee. Such monitoring is entirely reactive in nature, and creates a dangerous environment for passengers and a frustrating and cumbersome environment for the property owner and maintenance personnel, whether maintenance is outsourced or performed in house.

Preventive maintenance is difficult, at best, in the vertical transportation equipment industry. Taking an escalator out of service during rush hour is a major undertaking that is often avoided or delayed for as long as possible. On the other hand, repairing or maintaining equipment during business hours can reduce overtime costs for maintenance. Because of this dichotomy, planned repairs and maintenance tasks are often deferred, if unintentionally. Unfortunately, preventive maintenance cannot always be deferred successfully. Mechanical equipment demands service, and will eventually fail if service is not performed. However, routine and scheduled maintenance alone does nothing to resolve the problem of monitoring the equipment and passengers and property on the equipment and to preserve evidence of sudden failure, real or fraudulent personal injury and property damage, security breaches, or other events having potential legal significance to the owner.

In sum, liability, access, and system availability must be monitored and managed for any property owner to survive and thrive in today's fast-paced industries. Understanding these issues, the invention herein is designed not only to provide improved systems and methods for monitoring of new and existing elevators, escalators, and other vertical transportation equipment, but also to manage the information produced by such monitoring.

The invention described herein accomplishes the following objects:

Key Alarm Objects: Obtaining equipment fault and alarm information is important in managing and maintaining any transportation equipment system, and is particularly important for escalators and elevators. Alarm information gathered by the present invention comprises: 1) Providing out of service notification and alarms through various means, such as pagers, cell phones, and printers, for example; 2) Providing information as to how long the equipment was out of service; 3) Preserving information as to date and time a mechanic or contractor was notified; 4) Providing information as to when the equipment was returned to service; 5) Determining which equipment fault or alarm shut the equipment down; 6) Determining what was happening to the equipment when the fault or alarm occurred; 7) Recording and storing reliable records of all information relevant to the fault or alarm and its cause; 8) Automatically dispatching maintenance personnel through the use of electronic work orders that contain detailed information concerning the cause of the service interruption; and 9) Capturing video images for a predetermined time before, during, and after an alarm or fault.

Objects for Analysis, Repair, and Preventive Maintenance: While alarm information is valuable, it is only part of the system and method required to effectively manage building transportation equipment information and issues. Therefore, in order to manage preventative maintenance for building transportation equipment such as elevators, escalators, moving walkways, carousels, and automated doors the following objects apply: 1) enabling creation of a preventive maintenance program designed for a specific elevator or escalator system based upon requirements of the system in conjunction with data captured during in-service operation of the equipment; 2) updating the preventive maintenance program and schedule to reflect actual needs as determined by data captured during in-service operation of the equipment; 3) verifying that preventive maintenance is being performed; 4) managing and monitoring the activities of third parties such as contractors, maintenance personnel, and inspectors; 5) managing maintenance, repair, and testing efforts by owner's own personnel; 6) maintaining and managing records as up to date, complete, accurate, and timely; 7) reducing human error or mischief in the entry and preservation of equipment information; 8) reducing subjectivity in the preventive maintenance process, including making of records and determination of priority among equipment and tasks; 9) optimizing the performance requirements for preventive maintenance; 10) preserving and presenting accurate information and evidence relating to the availability and use of the equipment; and, 11) preserving accurate information and evidence to allow reliable reports and responses to owner and third parties when questioned on a specific incident or trend.

SUMMARY OF THE INVENTION

The Vertical Transportation-Maintenance Management System (VTMMS) invention described herein is directed towards an automated system and method for monitoring, management, and maintenance of vertical transportation equipment, including but not limited to elevators, escalators, moving walkways, carousels, revolving doors, and automated doors. The system and method of the present invention can also collect data from other building systems such as heating, ventilation and air conditioning (HVAC), electric service, and gas and water usage. The system and method collects data from the monitored equipment and preserves data that is related to equipment alarms, faults, failures, and maintenance requirements and activities as determined by equipment monitoring software. The monitoring software of the system writes corrective action and maintenance work orders, and provides remote access to linkable documents that aid in repair, maintenance, and trouble shooting of the monitored equipment. Linked cameras are provided to record, capture, and retrievably store images of monitored equipment and surrounding areas using a continuous loop for a pre-determined time frame before and after any fault or alarm. Camera images capture information and evidence for diagnosis, prevention of recurrence, and otherwise reliably preserve facts relevant to the cause of any fault or alarm.

Practiced embodiments of the present invention have been proven to provide information to the owner and his agents that is reliable, accurate and easy to use. Operational embodiments of the invention have been installed at transit terminals in Philadelphia and New Jersey (SEPTA and PATCO). In each installation, the transit authority was involved in projects to replace a significant number of escalators. The inventors designed and implemented each embodiment of the VTMMS to effectively link existing antiquated and newly installed modem transportation equipment to enable centralized remote monitoring, management, and maintenance of all linked equipment.

BRIEF DESCRIPTION OF THE DRAWINGS

FIG. 6 illustrates a work order display generated by the CMMS Server, which display appears on a LAN workstation or RTU display screen to permit interactive processing of work orders by maintenance personnel for monitored transportation equipment.

DESCRIPTION OF THE PREFERRED EMBODIMENTS

Figure 1:
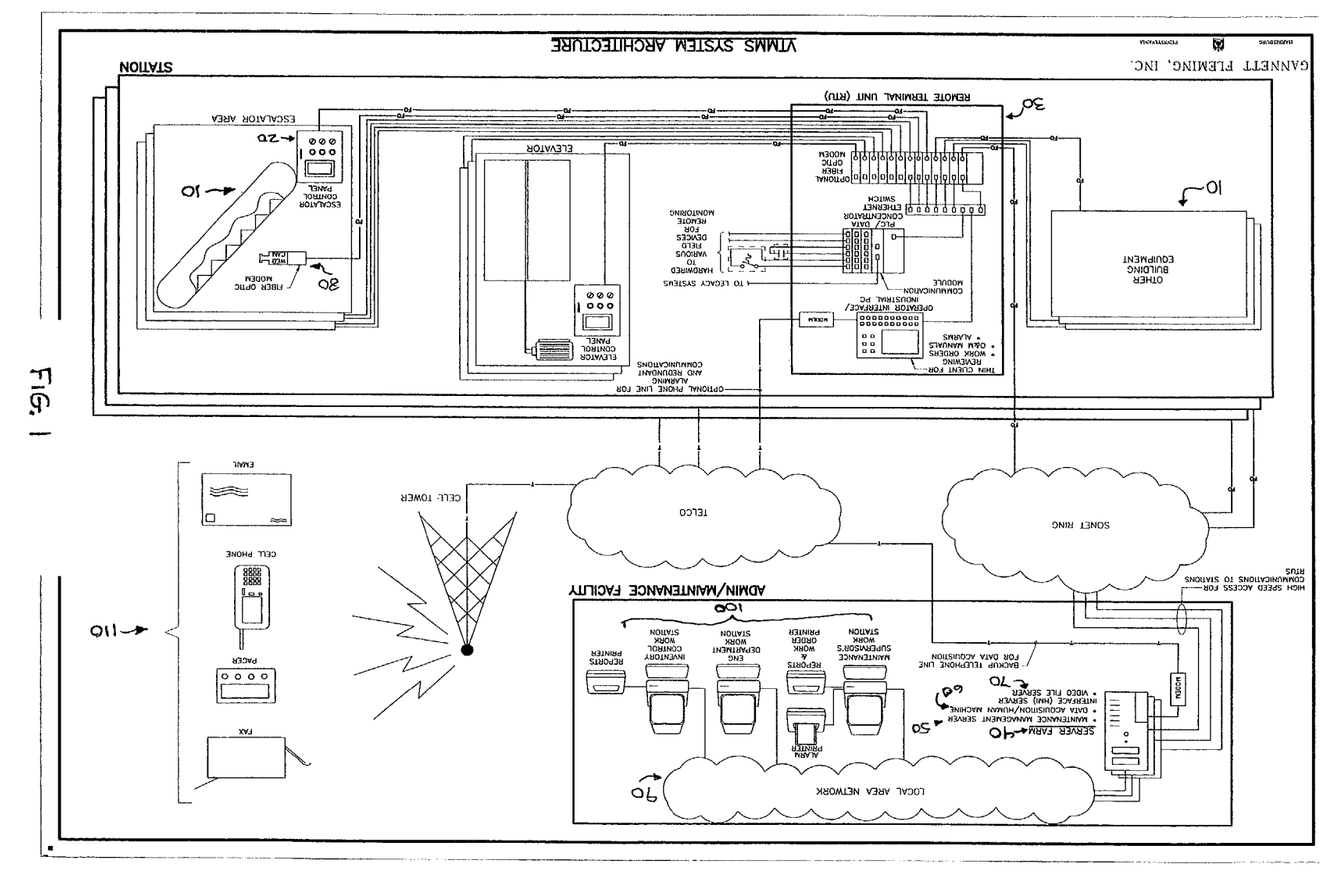
FIG. 1 illustrates a first embodiment of the system of the present invention.

FIG. 1 shows a schematic illustration of one embodiment of the VTMMS. In this embodiment, vertical transportation equipment 10 is provided in the form of one or more escalators and/or elevators. Preferably, each unit of transportation equipment 10 includes its own equipment controller 20. The equipment controller 20 is preferably a programmable logic control ("PLC"). In a preferred embodiment, the equipment controllers 20 are preferably Allen Bradley SLC 5/03 PLC controls. A key advantage to this particular controller selection is that all known escalator suppliers can supply their standard escalators with this particular PLC. Older vertical transportation equipment units which have non-PLC equipment controllers are adapted for inclusion in the VTMMS by one of several measures: hardwiring the equipment to the PLC inputs and outputs (I/O) of an RTU; installing a gateway in the RTU to communicate serial to the equipment; or, installing known smart field devices which communicate with the PLC over an open device network such as DeviceNet.

As shown in FIG. 1, each PLC is electronically linked to a Remote Terminal Unit ("RTU") 30. The means for linking can include any known communications link, including but not limited to wired means such as fiber, cable, twisted pairs, and the like, or wireless means such as radio. In one embodiment, the wireless means comprises FCC licensed radios in the 400 mhz range. In another embodiment, the communications means comprises FCC unlicensed spread spectrum radios in the 900 mhz range. In a more preferred embodiment, the communications link comprises an Ethernet 10BaseT or 10 BaseFL LAN located within the transit station or other real estate environment.

The RTU comprises a microprocessor, preferably a personal computer ("PC") comprising a central processing unit (CPU), a display monitor, and communication and connectivity means such as a modem. In a preferred embodiment, the RTU comprises a NEMA rate enclosure housing an industrial Personal Computer (PC) with touch screen and integral membrane keyboard, Programmable Logic Controller (PLC) and communication hardware consisting of an Ethernet hub or switch with optional fiber optic modems. Such RTUs are known, and can be identified or assembled though routine experimentation by one skilled in the art. In a preferred embodiment, the RTU 30 and its supporting software are manufactured and supplied by Rockwell Automation, Inc. and are compatible with the preferred Allen Bradley PLCs. However, Rockwell RTUs and Allen Bradley PLCs are not an absolute requirement The RTU 30 must be compatible with the equipment controller 20 to enable exchange of information between these components. The RTU acts as a data concentrator and view node or "seat" to enable two-way communication of information with the Server Farm 40. The RTU also acts as a buffer for each remote camera and as a communications protocol converter or gateway to communicate with various legacy systems. This is accomplished through the use of additional communication cards in the PLC 80.

In the embodiment of FIG. 1, the RTU 30 communicates remotely with a Server Farm 40. The Server Farm 40 in this embodiment is comprised of a CMMS server 50, HMI Server 60, and Video File Server 70, as more filly described below, to convey relevant real-time data corresponding to identified operational parameters of each linked unit of vertical transportation equipment, and to respond to alarms, work orders, and other information generated by the servers. For example, on escalators, the identified operational parameters include, but are not limited to: handrail speed; step speed; current draw on all motors; motor temperatures; electrical consumption (preferably in KW hours); direction of belt travel; deceleration rates, comb impact, total run time; run time by direction; and run time since last fault. Additional operational identifiers may apply to elevators, moving conveyors, revolving doors, automated doors, and other vertical transportation equipment.

Additionally, since each RTU is linked to a camera 80, live images of the transportation equipment 10 are captured and preserved. As shown in FIG. 1, each unit of transportation equipment 10 is monitored by one or more streaming video cameras 80 linked to an RTU. Alternatively, the camera may be a closed Circuit TV (CCTV) or security camera. When an equipment failure, fault, or alarm occurs, the camera 80 and RTU software capture and store an image loop of pre-determined length to preserve visual information before, during, and after the fault or alarm.

As shown in FIG. 1, the Server Farm 40 is preferably comprised of a CMMS Server 50, Video File Server 70, and HMI Server 60. Each server is comprised of a network server and supporting software. Server hardware and connectivity means are known in the art, and may be identified and assembled by one skilled in the art without undue experimentation. In a preferred embodiment, the HMI Server 60 is communicably connected to each RTU, and is also communicably connected to the Video File Server 70 and the CMMS Server 50.

In this embodiment, the HMI Server 60 comprises software which polls each RTU to collects real-time information concerning transportation equipment. The HMI Server 60 in this embodiment also serves as a gateway for users on a connected Local Area Network (LAN) 90 to view real-time data polled from each RTU 30, including but not limited to equipment status, alarms, historical data. Preferably, the HMI server software comprises RSLinx, RSView and RSSQL software or its equivalents. In the most preferred embodiment, the HMI server software is Allen Bradley/Rockwell HMI software. RSLinx software is used to communicate with the RTU and PLC and is commonly referred to as the PLC driver. The RSView software serves as the HMI software or kernel. The RSSQL software is used to communicate to the CMMS's database program. In this embodiment, the HMI Server 60 acts as a gateway or protocol converter to populate the CMMS server 50 and its associated database with polled information from each RTU 30.

In this preferred embodiment, the Video File Server 70 comprises software which polls the RTU 30 to retrieve and upload an image loop file from the RTU 30 after an equipment fault, failure, or alarm is detected. Preferably, each camera is controlled by, and is locked at, the Video File Server 70 so that no mischief at the equipment and/or camera site can turn off the image loop or otherwise disable the camera, software, or stored image data. The image loop file can be remotely accessed from the Video File Server 70, such as by using a PC and password to access a communications link such as a secure Internet website (not shown).

The CMMS server 50 comprises software which comprises an equipment module, work order module, and preventative maintenance module. In a preferred embodiment, the software comprises Windows NT, RSLinx, RSView, and RSSQ Microsoft SQL Server 7.0. The CMMS Server software comprises a database program such as Microsoft SQL Server and operational software such as Maximo™). Monitoring at the RTU in the industrial PC embodiment is through thick client software for both the CMMS and HMI software programs. In an alternative embodiment, the HMI software may reside directly on the RTU since there are typically more HMI drives for various PLC's then there are protocol changes/gateways for PLC to PLC communications.

The CMMS server software preferably additionally comprises Maximo™ software to provide coordination of all software modules and access to CMMS server information by LAN users at workstations 100... The CMMS equipment module is used to track equipment information such as repairs and associated costs, operational histories, and failures, faults, and alarms. The CMMS work order module is used to view detailed planning information work plans, schedules, costs, labor, materials, equipment, failure analysis, and to compare real-time budgets and estimates against actual and historical work orders. The CMMS preventative maintenance module generates preventative maintenance work orders automatically, preferably based upon dynamic analysis of past use and repairs and manufacturer's recommendations. Preferably, the CMMS software also contains a menu of online Operational and Maintenance (O&M) manuals, parts catalogs, wiring diagrams, parts inventories, and other information which can be accessed and displayed by LAN users and by maintenance personnel in response to any system alarm or work order at the RTU panel via the Industrial PC. Furthermore, the CMMS software contains functionality for sending information to remote devices and RTUs, as described more fully below.

Lastly, as shown in FIG. 1, the VTMMS apparatus comprises remote devices 110. The remote devices receive alarm signals generated by the CMMS server (alarm), thereby notifying responsible owners, maintenance personnel, and other pre-selected persons of a transportation equipment failure, fault or alarm. Remote devices comprise any device capable of receiving signals from the CMMS server, whether through wired or wireless means. Non-limiting examples of remote devices include, but are not limited to; personal computers; pagers; faxes, telephones; and personal digital assistants. Preferably, the remote device displays information in an aural or visual form, and preferably conveys information concerning the location of the equipment, time of the alarm or fault, and nature of the alarm or fault. In a preferred embodiment, the CMMS relays this information to a remote device, to the maintenance supervisor or to the owner and to the RTU. This feature allows a mechanic or other response personnel to view the same alarm information that was provided to the remote device to ensure that all responsible persons were provided with the same relevant alarm information, and to coordinate appropriate responses to the alarm. In a preferred embodiment, alarm signals are sent from the CMMS to at least two remote devices, and also to the RTU. Preferably, one of the devices is in the possession of the owner, and one is possessed by maintenance personnel, who must acknowledge the alarm and coordinate a response.

Additionally, the preferred embodiment of the system of the present invention includes CMMS software which deciphers the equipment fault relayed by the RTU, generates a work order that corresponds to the equipment fault, and transmits the work order to the RTU. The work order is then displayed on the RTU monitor for review and completion by maintenance personnel. Upon completion of the work order, the completed work order is sent to the CMMS, which captures and stores the work order, and extracts information from the completed work order to generate predictive and preventative maintenance schedules. In a preferred embodiment, the CMMS software generates work orders that correspond to the predictive and preventative maintenance schedules, and relays the work orders to the appropriate RTU for review and completion by maintenance personnel.

Figure 2:
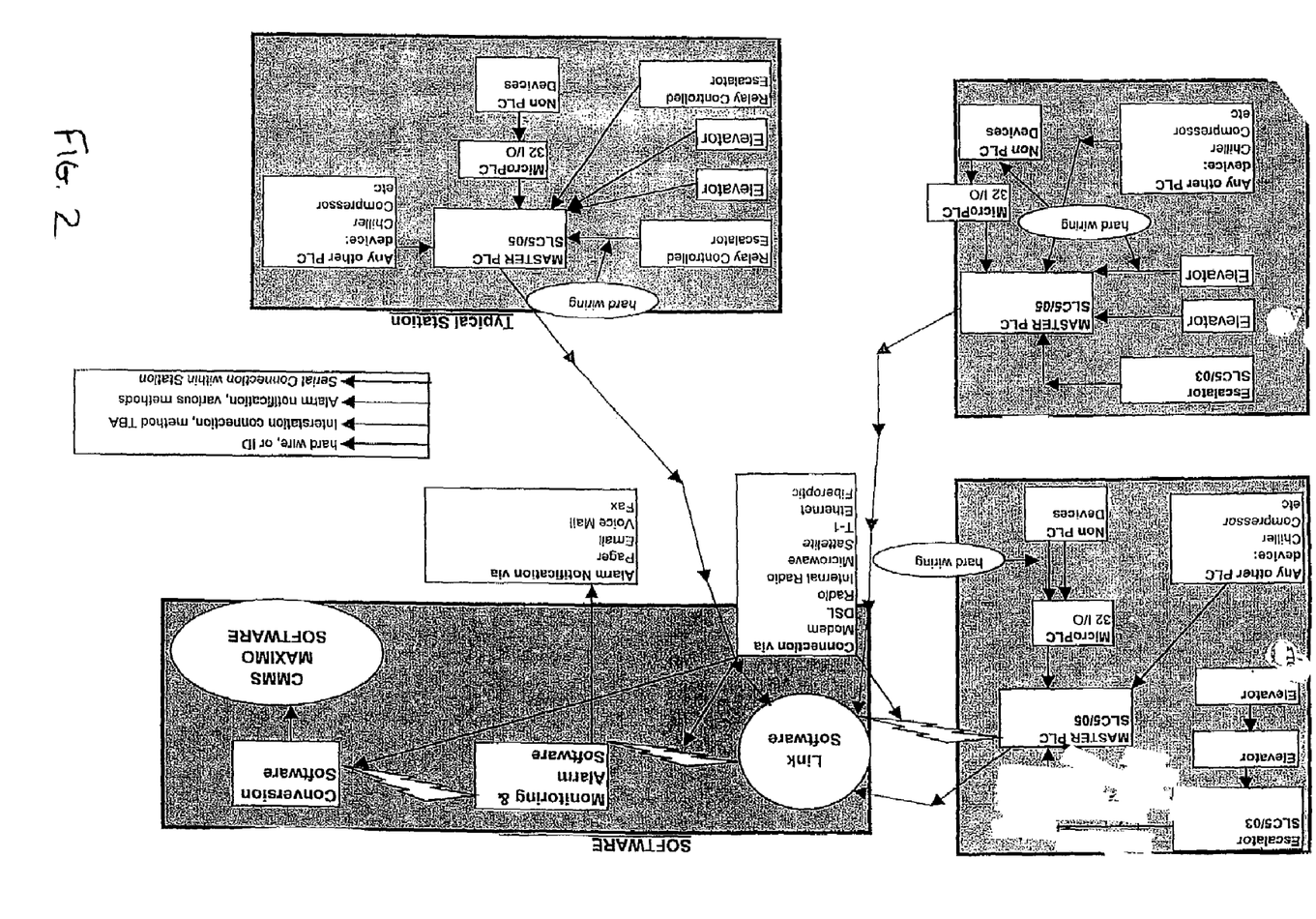
FIG. 2 illustrates a second embodiment of the system of the present invention.
Figure 3:
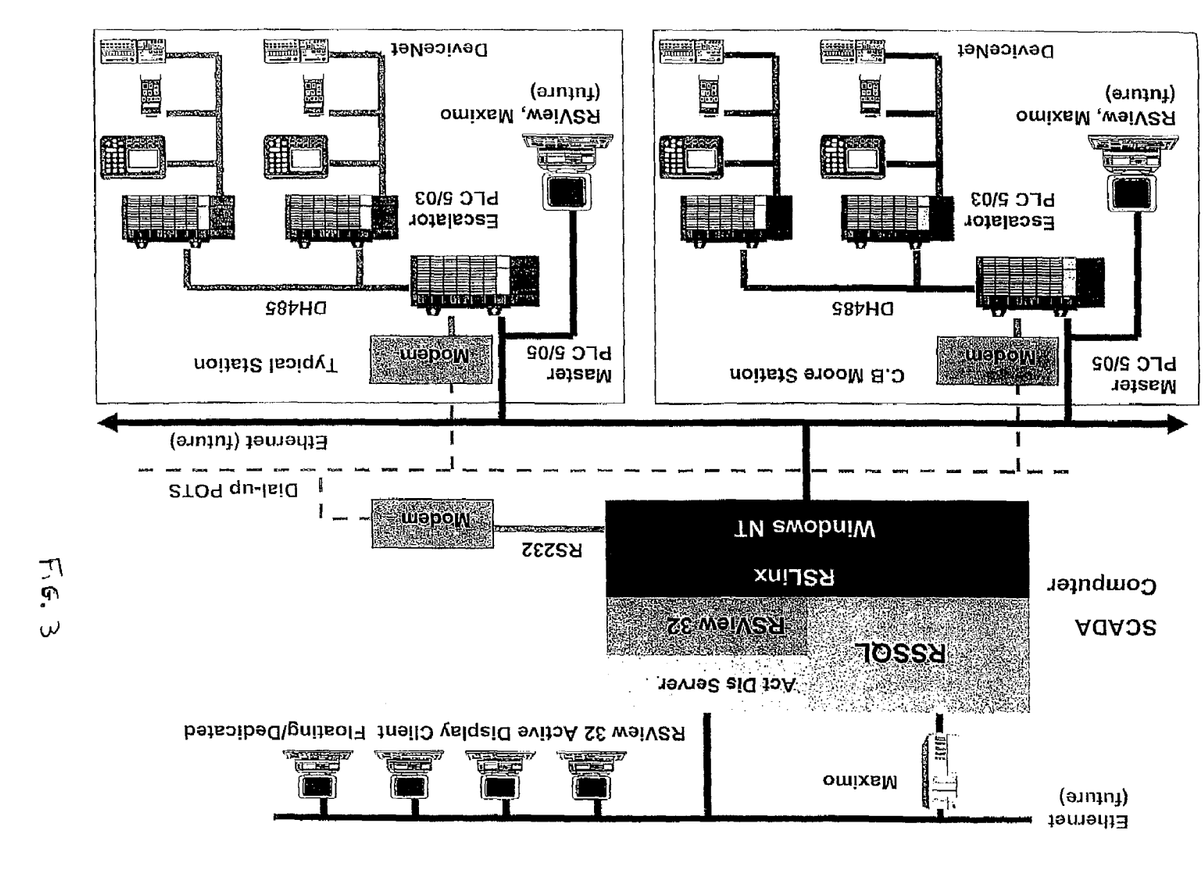
FIG. 3 illustrates a third embodiment of the system of the present invention.
Figure 4:
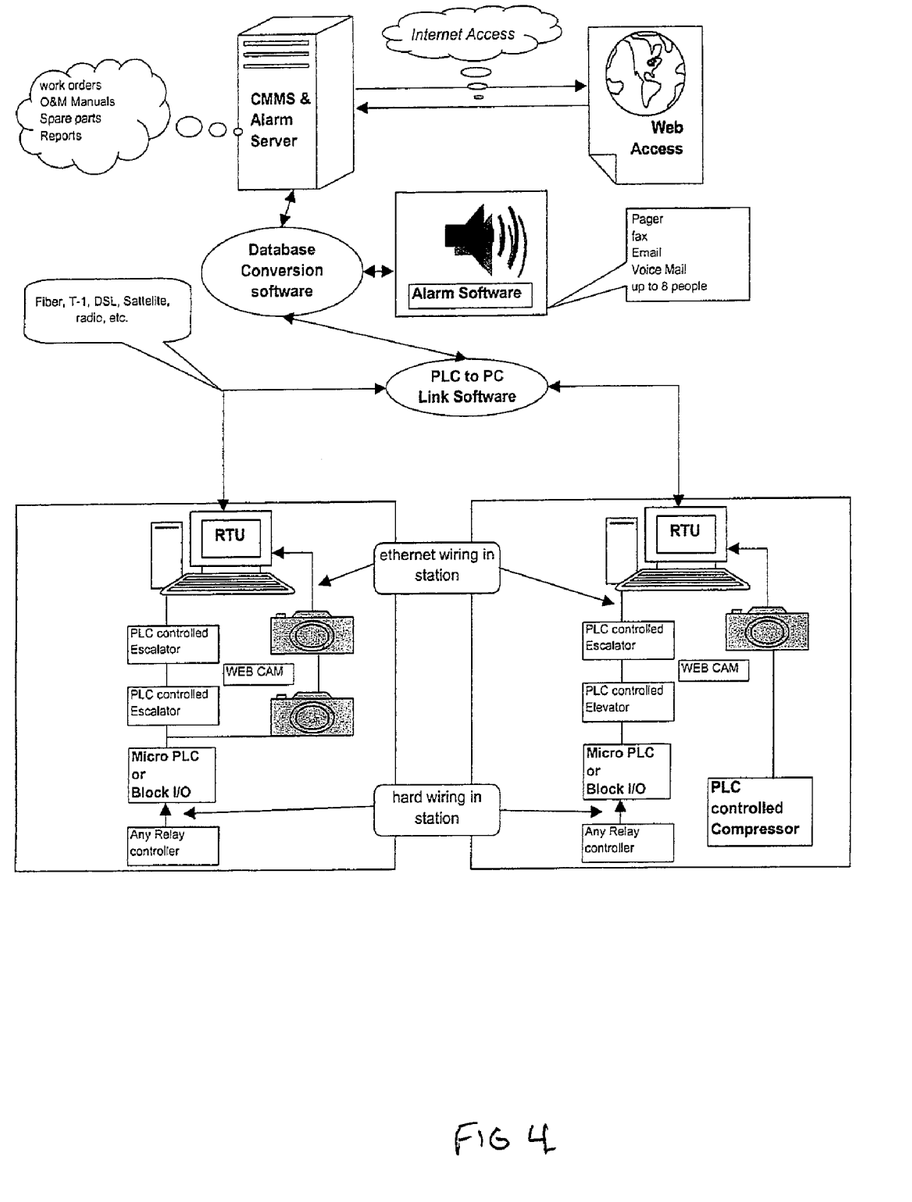
FIG. 4 illustrates a forth embodiment of the system of the present invention.
Figure 5A:
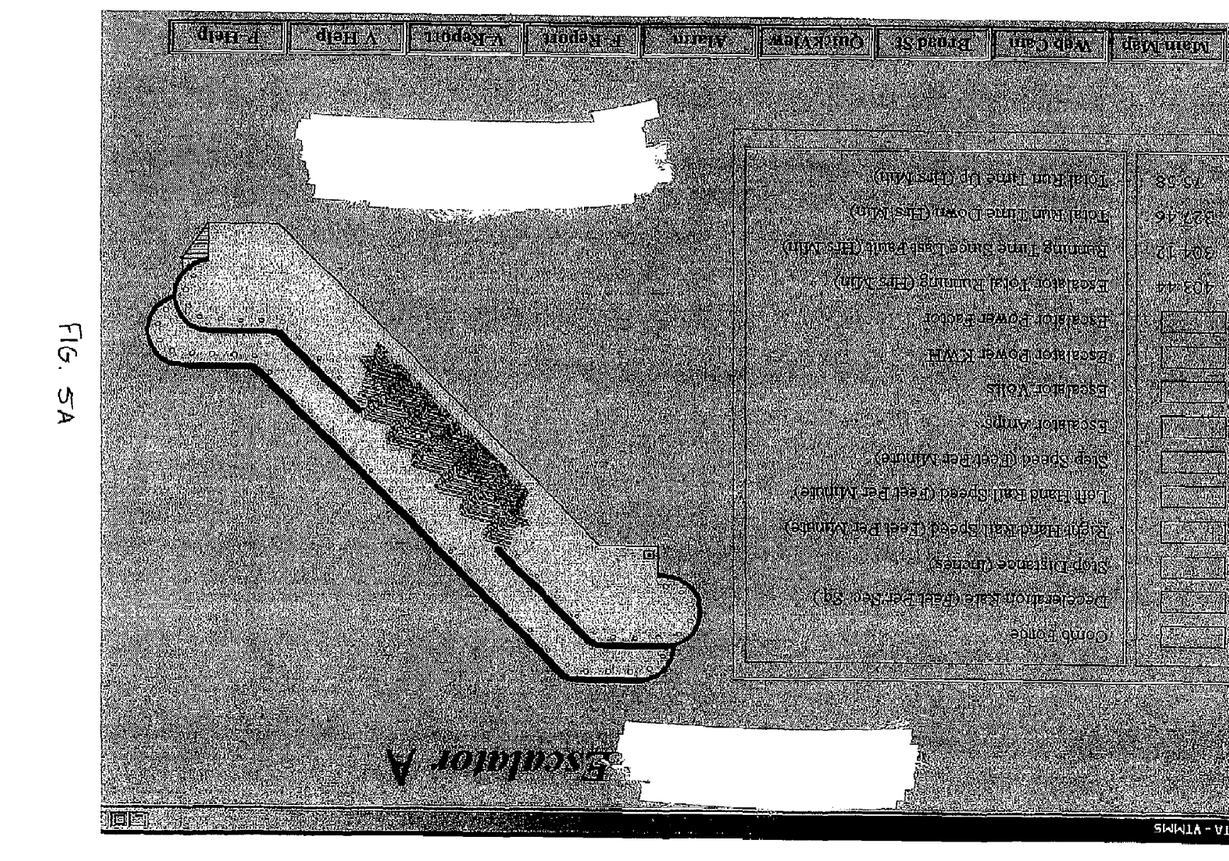
FIG. 5a illustrates a screen display generated by the HMI Server, which display appears on a LAN workstation or RTU display screen to show the operational status of identified parameters for monitored transportation equipment.
Figure 5B:
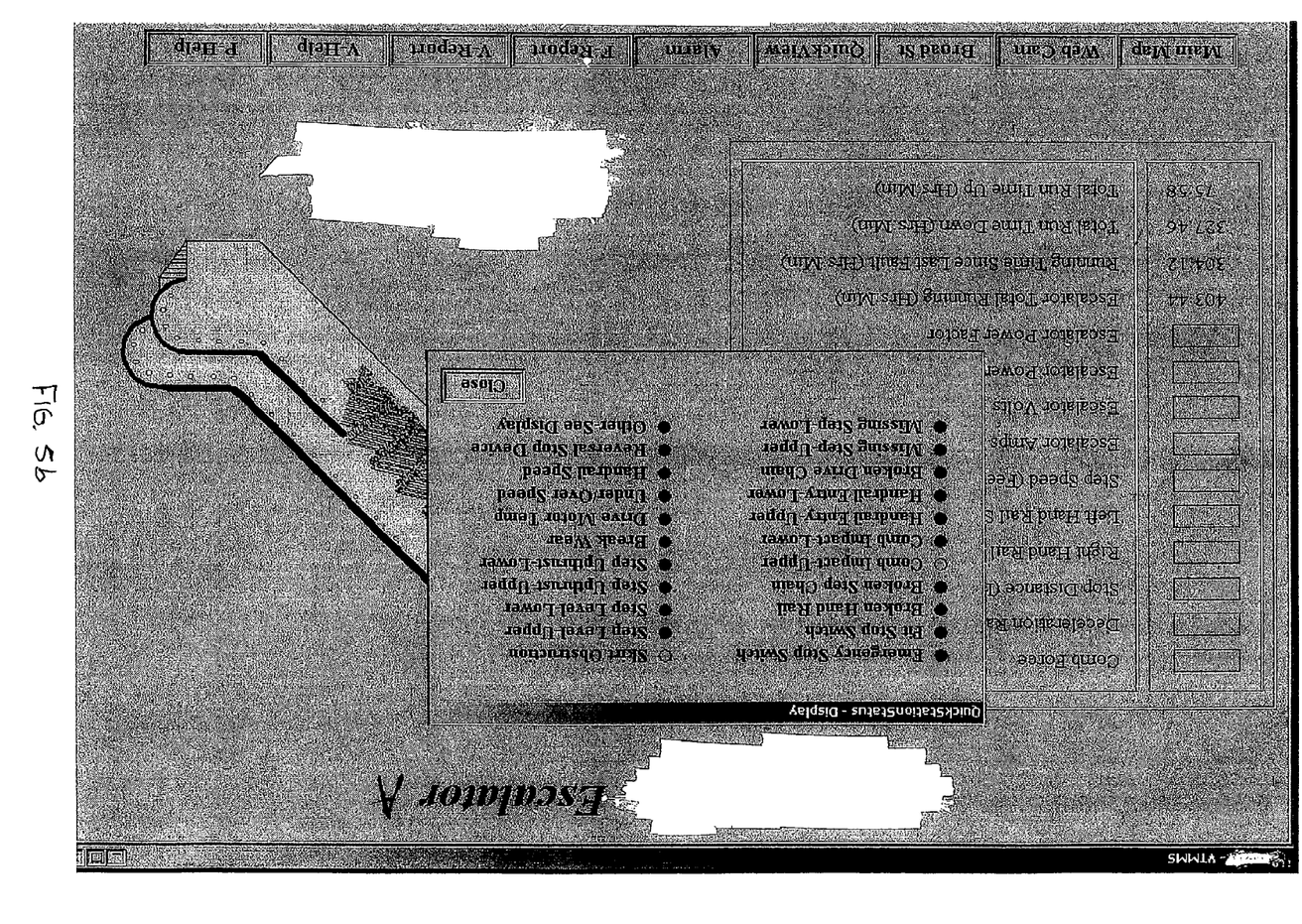
FIG. 5b illustrates a second screen display generated by the HMI Server, which display appears on a LAN workstation or RTU display screen to show the operational status of identified parameters for monitored transportation equipment.

Other embodiments of the system of the present invention are illustrated in FIGS. 2, 3, and 4. FIGS. 5a and 5b illustrate FIG. 5a illustrates a screen display generated by the HMI Server, which display appears on the LAN workstations 100 or RTU 30 display screen to show the operational status of identified parameters for monitored transportation equipment. FIG. 6 illustrates a work order display generated by the CMMS Server, which display appears on a LAN workstation 110 or RTU 30 display screen to permit interactive processing of work orders by maintenance personnel for monitored transportation equipment.

The present invention further comprises a method of monitoring and managing vertical transportation equipment. The method of the present invention comprises: providing vertical transportation equipment having a monitoring camera and monitoring sensors which are linked to an RTU, gathering real-time equipment information; detecting an equipment fault, failure, or alarm; capturing and storing real-time information relating to the equipment fault failure or alarm; transmitting information relating to the equipment fault to a server having software which generates a system alarm corresponding to the equipment fault, failure or alarm; transmitting the system alarm to a remote device (such as phone, fax, PC, PDA, or other device); generating a work order which corresponds to the system alarm; transmitting the work order for completion by maintenance personnel; capturing information from the completed work order; and generating predictive and preventative maintenance schedules using information from completed work orders.

In addition, it is to be expressly understood that while the present invention is illustrated and described in the context of a system and method for monitoring of vertical transportation equipment such as escalators, elevators, moving walkways, carousels, revolving doors, and automated doors, it is clearly applicable to any type of building transportation equipment. Without limiting the scope of the invention, the present invention are applicable to including but not limited to chillers, heaters, air handlers, and HVAC systems. It is to be appreciated and emphasized that the system and method set forth herein is independent of computer operating systems and will work equally well in a wireless environment such as those embodied by wireless internet phones, and PDA (personal digital assistant) devices.

The present invention is described with reference to the above-discussed preferred embodiments. It is to be recognized that other embodiments fulfill the spirit and scope of the present invention and that the true nature and scope of the present invention is to be determined with reference to the claims attached hereto.

I claim:

1. A system for remote monitoring of vertical transportation equipment comprising: a) vertical transportation equipment; b) a Remote Terminal Unit communicably linked to said vertical transportation equipment; c) a Human-Machine Interface Server communicably linked to said Remote Terminal Unit; d) a Computerized Maintenance Management System Server communicably linked to said Human-Machine Interface; and, e) remote devices which are communicably linked to said Computerized Maintenance Management System Server.

2. The system of claim 1, further comprising a Camera communicably linked to said Remote Terminal Unit.

3. The system of claim 1, further comprising a Video File Server communicably linked to said Human-Machine Interface Server.

4. The system of claim 1, further comprising a Local Area Network communicably linked to said Computerized Maintenance Management System Server.

5. The system of claim 4, further comprising a computer work station communicably linked to said Computerized Maintenance Management System Server by said Local Area Network.

6. A system for remote monitoring of vertical transportation equipment comprising: a) vertical transportation equipment having a Programmable Logic Control b) a Remote Terminal Unit communicably linked to said Programmable Logic Control; c) a Camera communicably linked to said Remote Terminal Unit d) a Human-Machine Interface Server communicably linked to said Remote Terminal Unit; e) a Computerized Maintenance Management System Server communicably linked to said Human-Machine Interface; and, f) remote devices which are communicably linked to said Computerized Maintenance Management System Server.

7. The system of claim 6, further comprising a Video File Server communicably linked to said Human-Machine Interface Server.

8. The system of claim 6, further comprising a Local Area Network communicably linked to said Computerized Maintenance Management System Server.

9. The system of claim 8, Further comprising a computer work station communicably linked to said Computerized Maintenance Management System Server by said Local Area Network.

10. A method of monitoring and managing vertical transportation equipment comprising: a) providing vertical transportation equipment; b) providing an equipment monitoring system which gathers real-time information corresponding to identified operational parameters for transportation equipment; c) detecting an equipment fault, failure, or alarm; d) capturing and storing information relating to said equipment fault, failure, or alarm; e) transmitting said information relating to said equipment fault, failure, or alarm to a server; and f) generating a system alarm corresponding to the equipment fault, failure or alarm; g) transmitting said system alarm to a remote device.

11. The method of claim 10, further comprising: a) generating a work order which corresponds to said equipment fault; b) transmitting said work order to a Remote Terminal Unit; c) completing the work order; d) capturing information from the completed work order; e) generating predictive and preventative maintenance schedules using information from completed work orders.

12. The method of claim 10 or 11, wherein said identified operational parameters are selected from the group consisting of, handrail speed, step speed, current draw on all motors, motor temperatures, electrical consumption, direction of belt travel, deceleration rates, safety device activation times, comb impact force, total run time, run time by direction, run time since last fault, stop distance, and down time.

13. The method of claim 10, wherein the equipment monitoring system is comprised of; a) vertical transportation equipment having a Programmable Logic Control b) a Remote Terminal Unit communicably linked to said Programmable Logic Control; c) a Camera communicably linked to said Remote Terminal Unit d) a Human-Machine Interface Server communicably linked to said Remote Terminal Unit; e) a Computerized Maintenance Management System Server communicably linked to said Human-Machine Interface; and, f) remote devices which are communicably linked to said Computerized Maintenance Management System Server.

14. The method of claim 13, wherein the equipment monitoring system is further comprised of a Video File Server communicably linked to said Human-Machine Interface Server.

15. The method of claim 14, wherein said real-time information comprises video images of the equipment and surrounding areas.

16. A method of monitoring vertical transportation equipment comprising gathering real-time information corresponding to identified operational parameters, wherein said operational parameters are selected from the group consisting of: speed of travel, current draw on all motors, motor temperatures, electrical consumption, direction of travel, deceleration rates, safety device activation times, comb impact force, total run time, run time by direction, run time since last fault, stop distance, and down time.

17. The method of claim 16, wherein said vertical transportation equipment is selected from the group consisting of: escalators, elevators, moving walkways, carousels, revolving doors, and automated doors.

18. The method of claim 17, wherein said gathering of real-time information is performed by electronic means.

19. The method of claim 18, wherein said real-time information comprises video images of the equipment and surrounding areas.

\* \* \* \* \*